United States Patent Office 3,455,877
Patented July 15, 1969

3,455,877
ORGANOSILICON EPOXIDES
Edwin P. Plueddemann, Midland, Mich., assignor to Dow Corning Corporation, Midland, Mich., a corporation of Michigan
No Drawing. Continuation-in-part of application Ser. No. 747,579, July 10, 1958, which is a continuation-in-part of application Ser. No. 618,669, Oct. 29, 1956. This application Feb. 19, 1962, Ser. No. 174,238
Int. Cl. C08g *31/12*; C07f *7/18*
U.S. Cl. 260—46.5     11 Claims This invention relates to organosilicon epoxides wherein the epoxy group or the radical containing the epoxy group is attached to the silicon by silicon-carbon linkage.

This application is a continuation-in-part of applicant's copending application Ser. No. 747,579, filed July 10, 1958, which in turn is a continuation-in-part of his application Ser. No. 618,669, filed Oct. 29, 1956, both now abandoned.

It is known that epoxide resins can be modified by incorporating therein various types of organosilicon compounds. This has been done by merely blending organo-silicon compounds with epoxide resins or by reacting chlorosilanes, alkoxysilanes or partial hydrolyzates thereof or hydroxylated organosilicon compounds with an epoxide resin. The reaction is believed to proceed by condensation of the functional group on the silicon, that is OH, OR or halogen, with the hydroxyl groups in the epoxide resin or with the epoxy group itself in the case of chlorosilanes.

The above procedures have produced useful silicone modified epoxide resins. However, in all cases the materials were either merely blends or the silicon portion was attached to the epoxide resin through an SiOC linkage. As is known this linkage is basically hydrolytically unstable and consequently is much less resistant to alkali and other hydrolytic reagents than the other linkages in an epoxide resin. This is disadvantageous because organic epoxide resins themselves are tied together through organic ether linkages which are exceptionally stable to alkaline reagents. It would be highly desirable, therefore, to be able to produce a silicone epoxide which does not contain the basically unstable SiOC linkage.

It is the primary object of this invention to produce novel compositions of matter having an epoxide group attached to silicon through a SiC linkage thereby giving greater inherent stability to the molecule. Another object is to prepare novel compositoins of matter which are useful in the preparation of coating resins, laminates, and as intermediates in the preparation of other organosilicon materials. Other objects and advantages will be apparent from the following description.

This invention relates to organosilicon compounds of the formula $A_mR'''_nSiX_{4-m-n}$ in which A is selected from the group of radicals of the formulae

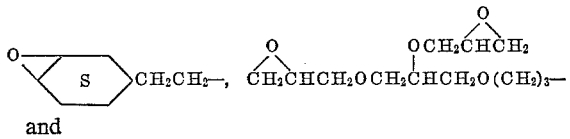

and

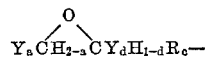

in which each
Y is an alkyl radical of from 1 to 2 inclusive carbon atoms,
$a$ has a value from 0 to 2 inclusive,
$c$ and $d$ each have a value of 0 to 1 inclusive, R is selected from the group consisting of divalent hydrocarbon radicals of no more than 12 carbon atoms, said hydrocarbon radicals being selected from the group consisting of saturated aliphatic hydrocarbon radicals and arylene radicals and divalent radicals of the formula $-R''(OR'')_bOR''-$, in which any two O atoms are separated by at least two carbon atoms and each
R" is a divalent saturated aliphatic hydrocarbon radical of from 1 to 6 inclusive carbon atoms and
$b$ has a value from 0 to 8 inclusive,
R''' is selected from the group consisting of alkyl radicals of from 1 to 18 inclusive carbon atoms, vinyl, phenyl, xenyl, halophenyl and trifluoropropyl radicals,
$m$ has a value of from 1 to 4 inclusive,
$n$ has a value of from 0 to 3 inclusive, and
X is selected from the group consisting of hydroxyl, phenoxy, halophenoxy and lower alkoxy radicals.

This invention also relates to siloxanes of the unit formula $$A_mR'''_nSiO_{\frac{4-m-n}{2}}$$

in which A and R''' are as above defined, $m$ has a value from 1 to 3 and $n$ has a value from 0 to 2.

For the purpose of this invention the term "epoxy group" refers to the group

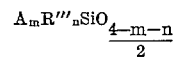

The term "epoxidized group" refers to a radical containing 1 or more epoxy groups. The term "hydrocarbonoxy radical" refers to a radical of the formula RO— where R is hydrocarbon and the term "halohydrocarbonoxy group" refers to the same type radical where R is halohydrocarbon.

The compositions included within the scope of this invention are of two general types. The first type includes organosilicon compounds having from 1 to 4 epoxy groups or epoxidized groups attached to each silicon atom. The other type includes organosilicon compounds in which only a portion of the silicon atoms have epoxy or epoxidized groups attached thereto. Both of these types of compounds can be prepared by two basic methods.

The first method is the reaction of an organosilicon compound containing a radical having a C=C linkage, with peracids such as peracetic acid, perbenzoic acid, perpropionic acid, etc. The reaction takes place best when the reaction mixture is warmed gently. These per-acids oxidize the double bond to produce an epoxy group in accordance with the reaction

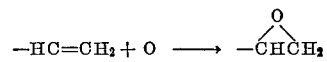

This reaction is applicable to any organosilicon compound containing a C=C group in any portion of the molecule. Thus, for example, one may oxidize vinyltriethoxysilane, divinylpolysiloxane, hexavinyldisiloxane, cyclopentenylmethylsiloxane, hexenylmethyldiphenoxysilane, cyclohexenylphenyl bis-chlorophenoxysilane, and tetravinylsilane. By controlling the proportion of per-acid employed and/or the reaction time one can oxidize one or all of the unsaturated groups on the silicon. Thus, for example, one can prepare

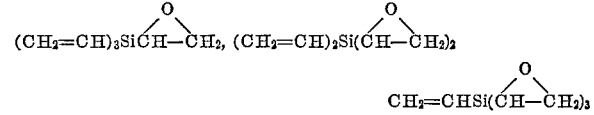

or

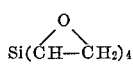

The second basic method for preparing the compositions of this invention is that of adding an unsaturated organic compound containing at least one epoxy group to a silicon compound containing at least one SiH group. This reaction proceeds by way of addition of the SiH to the C=C linkage in the unsaturated organic compound. This reaction is carried out by heating a mixture of the SiH compound and the unsaturated organic epoxide. Preferably the reaction is carried out in the presence of a silane addition catalyst such as platinum, ultraviolet light or organic peroxides.

This invention includes within its scope organosilicon compounds having any epoxidized group attached to the silicon through SiC linkages. Preferably the epoxy or epoxidized group contains C, H, halogen and O in the form of ether linkages and OH groups. Consequently, this invention includes compounds in which the epoxidized group contains one or any number of epoxy groups. Specific examples of epoxidized groups which are attached to the silicon atoms are groups of the formula

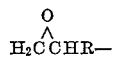

in which R is any divalent organic radical such as hydrocarbon radicals such as methylene, ethylene, butylene, phenylene, xenylene, tolylene, or

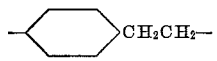

or any hydroxylated hydrocarbon radical; and halohydrocarbon radical such as chloroethylene, fluoroethylene, bromophenylene, and bromoxenylene and any divalent ether radical of the type $(R''OR'')_x$ where each $R''$ can be any of the group listed under R and $x$ is an integer of at least 1. Specific examples of such divalent ether groups are $$\begin{array}{c} \text{Me} \\ | \\ CH_2CH_2OCH_2CH_2, \quad -CH_2CH_2OCHCH_2 \end{array}$$

$-CH_2(OCH_2CH_2)_6OCH_2CH_2CH_2-$, $-CH_2OCH_2CH_2OCH_2CH_2-$ $-CH_2OCH_2CH=CH-$ and $-CH_2CH_2CH_2CH_2CHCH_2OCH_2-$
$\phantom{-CH_2OCH_2CH=CH- \text{ and } -CH_2CH_2CH_2CH_2CH}|$
$\phantom{-CH_2OCH_2CH=CH- \text{ and } -CH_2CH_2CH_2CH_2CH}OH$ The epoxidized group can also be of the formula

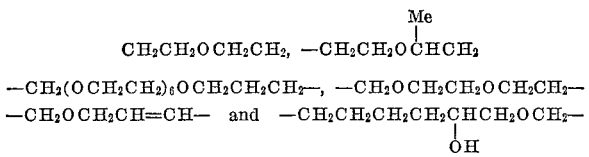

in which R is as above defined and Y can be any organic radical such as monovalent hydrocarbon radicals, halogenated monovalent hydrocarbon radicals, hydroxylated hydrocarbon radicals or divalent ether radicals of the type —R″OR″—. This type of compound can be prepared by oxidizing a silicon compound having an alkenyl group containing a non-terminal C=C linkage. For example, $CH_3CH_2CH=CHCH_2CH_2Si\equiv$ can be oxidized with peracetic acid to produce

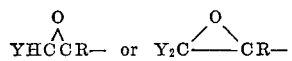

Alternatively such compounds can be prepared by the addition of epoxides of the formula

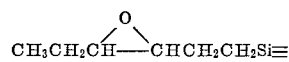

where R′ is an alkenyl radical to SiH compounds.

Another type of epoxidized group which is within the scope of this invention are those containing more than one epoxide group such as, for example, compounds of the formula

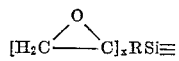

in which R is a polyvalent organic radical. In these epoxidized groups R can be any polyvalent organic radical such as any hydrocarbon, halohydrocarbon, hydroxylated-hydrocarbon or a polyvalent ether radical such as those above defined. This type of compound can be prepared by the general reaction of adding any unsaturated ether of a polyepoxide to an SiH compound. For example, one can add the allyl ether of bis-glycidyl ether of glycerin to methyldiethoxysilane. Alternatively the compound can be prepared by adding any polyhydric alcohol having a C=C linkage therein to an SiH compound and thereafter reacting the hydroxyl groups of the polyhydric alcohol residue with epichlorohydrin followed by reaction with alkali to produce the epoxy groups. The basic reactions involved are

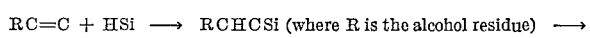
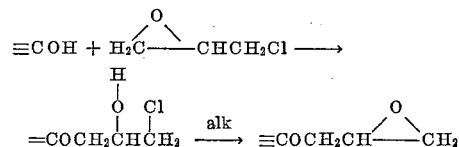

The organosilicon compounds within the scope of this invention can be silanes or siloxanes. Consequently, specific examples of types of organosilicon compounds included herein are those of the type $A_nSiX_{4-n}$ in which A is an epoxy or an epoxidized radical, X is a hydrocarbonoxy group or a hydroxyl radical, and $n$ has a value from 1 to 4 inclusive; compounds of the formula $A_mR'''_nSiX_{4-n-m}$ in which $R'''$ is hydrogen, a monovalent hydrocarbon radical or a halogenated monovalent hydrocarbon radical, $m$ and $n$ have values from 1 to 3 and the other symbols are as above defined; and compounds of the formula $$A_mR'''_nSiO_{\frac{4-n-m}{2}}$$

in which $m$ is 1 to 3 and $n$ is 0 to 2.

The siloxanes which are within the scope of this invention can be prepared by hydrolyzing or condensing the above silanes where X is a hydrolyzable group or a condensable group. In addition, the siloxanes of this invention can be prepared by reacting an unsaturated epoxide with a siloxane containing SiH groups or by oxidizing a siloxane containing radicals having C=C linkages with peracides as above defined.

The siloxanes within the scope of this invention can be homopolymeric siloxanes in which each silicon atom contains at least one epoxy or epoxidized group or they can be copolymeric siloxanes in which each silicon atom contains epoxy or epoxidized groups. In addition, the siloxanes within the scope of this invention contain copolymers wherein some of the silicon atoms have epoxy or epoxidized groups attached thereto and the remaining silicon atoms are substituted with hydrocarbon radicals, halohydrocarbon radicals, hydroxyl groups, hydrocarbonoxy groups, halohydrocarbonoxy groups, hydrogen atoms and oxygen atoms. In these copolymers the mol percent of siloxane units having epoxy or epoxidized groups attached thereto can range from .001 to 99.999. These copolymers of the epoxidized siloxane and conventional siloaxanes can be prepared by any of the above reactions or by cocondensing epoxidized siloxanes with conventional siloxanes in the presence of an alkali metal salt of a siloxane.

The following are specific examples of organosilicon compounds within the scope of this invention in which A represents the same or different species of any of the epoxy or epoxidized groups defined above: AMeSiO, $A_2PhSiO_{1/2}$; $ASiO_{3/2}$; $A_3EtSi$; copolymers of APhSiO and MePhSiO; copolymers of AMeSiO, trifluoropropyl methylsiloxane and monomethylsiloxane; copolymers of (CF$_3$CH$_2$CH$_2$)ASiO, diphenylsiloxane, monophenylsiloxane and stearylmethylsiloxane; copolymers of (C$_{18}$H$_{37}$)ASiO and (CH$_2$=CH)ASiO; copolymers of chlorophenylmethylsiloxane, ASiO$_{3/2}$ and α,α,α-trifluorotolylmethylsiloxane; copolymers of cyclohexyldimethylsiloxane, monovinylsiloxane, hexenylmethylsiloxane and (ClC$_6$H$_4$)ASiO; copolymers of A(C$_6$H$_5$C$_6$H$_4$)$_2$SiO$_{1/2}$, propylhydrogensiloxane and dibutylsiloxane and copolymers of allylmethylsiloxane, SiO$_2$ and AMeSiO.

The epoxide organosilicon compounds of this invention can be cured by reacting them with conventional epoxide curing catalysts such as amines, polyamides, polyhydroxy compounds, polycarboxylic acids, and acid anhydrides, aminoplast resins, alkyd resins and phenolic resins. The reaction proceeds at temperatures ranging from room temperature up to 200° C. By this means the compositions of this invention can be formed into cured moldings, castings and films. The best resins are formed from epoxidized siloxanes. These resins are excellent for coating metals and glass and also are useful as adhesives.

In addition, the epoxy silicon compounds of this invention can be employed to modify organic resins. They can be incorporated into any organic resin which has a functional group containing an active hydrogen. Thus, for example, they can be incorporated into epoxide resins, alkyl resins, aminoplast resins, polyamide resins and other organosiloxanes containing organic functional groups such as hydroxyl, amino, carboxyl or amide groups. The modified products made by reacting organic resins with the products of this invention are useful as lubricants coating compositions, casting resins and paints.

All of the modified compositions mentioned above exhibit superior thermal stability, ultraviolet resistance, weathering properties and oxidation resistance to the corresponding organic compounds containing no silicon.

The compositions of this invention can also be used as intermediates in the preparation of organic modified silicon compounds in which the modification occurs by reaction of the epoxide group with a reagent. Thus, it is possible to employ the compositions of this invention to prepare a wide variety of organo functional modified organosilicon compounds in all of which the organo functional group is attached to silicon through a silicon-carbon linkage. Specific examples of such reactions and the derivatives obtained thereby are the reaction of the epoxide with water to obtain a glycol, with hydrogen chloride to obtain a chlorohydrin, with nitric acid to obtain a hydroxy nitrate ester, with carboxylic acids to obtain hydroxy esters, with ammonia or amines to obtain hydroxyl amine, with hydrocyanic acid to obtain the cyanohydrins, with sodium sulfite to obtain the hydroxy sodium sulfonate, with phenols to obtain hydroxy phenylethers, with Grignard reagents to obtain hydroxy alcohols, with alcohols to obtain hydroxy ethers, with aldehydes and ketones to obtain acetals, with hydrogen sulfide to obtain hydroxy thiols, with phosphoric acid to obtain hydroxy phosphate esters and with mercaptans to obtain hydroxy thio esters. In addition, the epoxide group can be reduced with hydrogen to obtain alcohols.

The above derivatives can be used as emulsifiers, plasticizers for organic and organosilicon resins, as lubricants, as intermediates in the preparation of organosilicon resins and as modifiers for organic resins.

The following examples are illustrative only and should not be construed as limiting the invention which is properly delineated in the appended claims.

Example 1

2.2 moles of allyl glycidyl ether were added to a refluxing mixture of 270 g. of tetramethyldisiloxane and 250 g. of toluene, which mixture contained 10 drops of .34% by weight platinum added in the form of a diethylene glycol dimethyl ether solution of chloroplatinic acid. The reflux temperature increased from 84 to 98° C. during the 45 minutes addition time. After an additional 2 hours the reflux temperature was 116° C. The resulting product was fractionally distilled to give 285 g. of

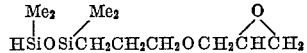

having the following properties: boiling point 92 to 98° C. at .2 mm., $d_4^{25}$ .9006, $n_D^{25}$ 1.4271, having an epoxide equivalent of .44 per 100 g. of product.

Further distillation gave 120 g. of the compound

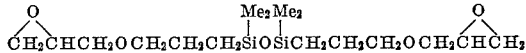

having the following properties: boiling point 172 to 175° C. at .5 mm., $d_4^{25}$ .9989, $n_D^{25}$ 1.4460, viscosity 7 cs. at 25° C. and having an epoxide equivalent of .55 per 100 g.

Example 2

95 g. of vinylcyclohexenemonoepoxide were added slowly to a refluxing mixture of 30 g. of (MeHSiO)$_5$, 70 g. of benzene and 25 drops of a solution of chloroplatinic acid in diethylene glycol dimethyl ether, which solution contained .1% by weight platinum. The mixture was refluxed for an additional hour and then the solvent was removed and the product treated with KOH in aqueous methanol to remove any remaining SiH. The material was washed neutral and again stripped to remove volatiles. The residue was filtered and there was obtained 80 g. of a clear liquid having a viscosity of 32,000 cs. at 25° C. and having an epoxide equivalent of .6 per 100 g. This corresponds to the material having the formula

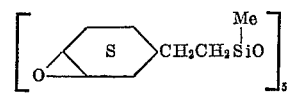

This silicone epoxide was cured by adding 16 parts per 100 parts silicone of m-phenylene diamine and heating the mixture to melt the catalyst and then heated 24 hours at 125° C. A hard, tough, heat stable resin was obtained. The resin showed no weight loss or change in appearance in 3 hours at 250° C.

Example 3

95 g. of 40% peracetic acid dissolved in acetic acid were added dropwise to .5 mol of vinylpentamethyldisiloxane and 5 g. of sodium acetate. The mixture was stirred and warmed 8 hours at 40 to 50° C. The solution was filtered and the filtrate was washed with water and distilled to give 17 g. of the product

having the following properties: boiling point 45 to 50° C. at 10 mm., $d_4^{25}$ .8767, $n_D^{25}$ 1.4068 and having an epoxide equivalent of .52 per 100 g.

Example 4

Cyclohexenylethylmethyldichlorosilane was prepared by adding vinylcyclohexene to methyldichlorosilane in the presence of a platinum catalyst.

One mol of the cyclohexenyl ethylmethyldichlorosilane was cohydrolyzed with 1 mol of phenylmethyldichlorosilane and the resulting copolymer was diluted with an equal weight of benzene and stirred at 10 to 15° C. while adding 47 g. of 40% peracetic acid in acetic acid and 5 g. of sodium acetate. The addition required 2 hours. The mixture was then stirred 4 hours at 15 to 20° C. and poured into salt water and washed free of acid. The solvent was removed by distillation to give 65 g. of an oily copolymer having a viscosity of 3600 cs. and an epoxide equivalent of .29 per 100 g. This product was a copolymer of phenylmethylsiloxane and

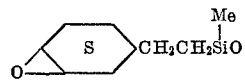

A portion of this product was mixed with 8% by weight of m-phenylenediamine and cured at 120 to 130° C. A hard, brittle resin having strong adhesion to glass was obtained.

Example 5

Styrylmethyldichlorosilane was prepared by reacting chlorostyrene with methyldichlorosilane in a hot tube at 600° C. The product was hydrolyzed to give styrylmethylsiloxane. A solution of 110 g. of styrylmethylsiloxane was dissolved in 150 g. of benzene and 5 g. of sodium acetate was added. The mixture was stirred at 10 to 15° C. during the addition of 90 g. of peracetic acid in acetic acid. The mixture was stirred for 3 hours and allowed to warm to 30° C. and then warmed at 40 to 50° C. for an additional 3 hours. The product was washed with water and stripped free of solvent. A hazy, viscous, resinous product was obtained which had the unit formula

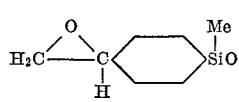

It cured at room temperature to an insoluble resin when mixed with diethylenetriamine.

Example 6

Methyldichlorosilane was added to 2,5-dimethylhexadiene-1,5 to give 2,5-dimethyl 5-hexenylmethyldichlorosilane. This material was hydrolyzed to the siloxane and the resulting hydrolyzate was equilibrated with KOH in toluene solution. The solution was cooled to 10° C. and 125 g. of 40% peracetic acid in acetic acid containing 12 g. of sodium acetate was added. The mixture was stirred for 4 hours at 20° C., washed with water and stripped to a temperature of 150° C. at 5 mm. to remove volatiles. There was obtained 103 g. of oily product having the unit formula

Example 7

Phenyldiethoxysilane was reacted with .23 mol percent excess allyl glycidyl ether in accordance with the procedure of Example 1. Upon distillation of the product the compound

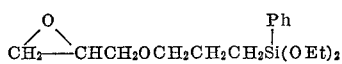

having a $d_4^{25}$ of 1.045 was obtained.

Example 8

The compound $Si(OSiMe_2H)_4$ was reacted with a 50 mol percent excess of allyl glycidyl ether in accordance with the procedure of Example 1. The product was a material of the formula

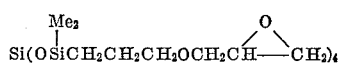

having the following properties: $n_D^{25}$ 1.4731, $d_4^{25}$ 1.054, viscosity 38.8 cs. at 25° C.

Example 9

The compound $PhSi(OSiMe_2H)_3$ was reacted with a 130 mol percent excess of allyl glycidyl ether in accordance with the procedure of Example 1. There was obtained the compound

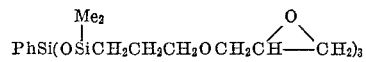

having the following properties: $n_D^{25}$ 1.4492, $d_4^{25}$ 1.040, viscosity 27.7 cs. at 25° C.

Example 10

A copolymeric siloxane corresponding to the average general formula

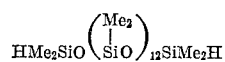

was reacted with a 100 mol excess of allyl glycidyl ether in accordance with the procedure of Example 1. The resulting product had the average formula

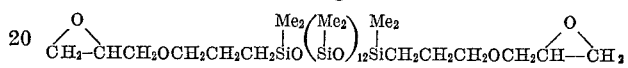

having the following properties: $n_D^{25}$ 1.4121, $d_4^{25}$ .977, viscosity 19.1 cs. at 25° C.

Example 11

A copolymeric siloxane comprising 5 mol percent methylhydrogensiloxane and the remainder being dimethylsiloxane and trimethylsiloxane was reacted with a 200 mol percent excess of allyl glycidyl ether in accordance with the procedure of Example 2. A copolymeric product was obtained having the composition 5 mol percent

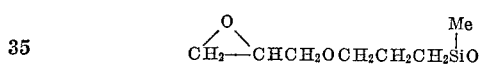

and the remainder being dimethylsiloxane and trimethylsiloxane. This copolymer was a fluid having a viscosity of 48 cs. at 25° C.

Example 12

A copolymeric siloxane containing equimolar amounts of phenylmethylsiloxane, phenylhydrogensiloxane, and methylhydrogensiloxane was reacted with a 335 mol percent excess of allyl glycidyl ether in accordance with the procedure of Example 2. There was obtained a fluid copolymeric material having a viscosity of 1220 cs. at 25° C. and being composed of 33⅓ mol percent phenylmethylsiloxane, 33⅓ mol percent

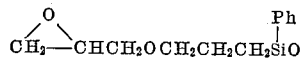

and 33⅓ mol percent

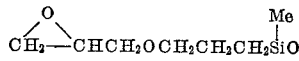

Example 13

A copolymer of 50 mol percent PhMeSiO and 50 mol percent PhHSiO was reacted with a 200 mol percent excess of allyl glycidyl ether in accordance with the procedure of Example 2. The resulting product was a viscous copolymer of PhMeSiO and

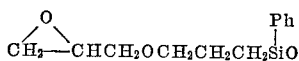

This copolymer was blended in xylene with 30% by weight of a commercial butylated urea formaldehyde coating resin and applied to copper, aluminum and glass. Each sample was heated at 150° C. and cured to a clear, flexible, tough film.

Example 14

When the following epoxides are reacted with the following organosilanes in the presence of 3% by weight platinum added as chloroplatinic acid, at a temperature of 80° C. the following products are obtained:

| Epoxide | Silane | Product |
|---|---|---|
| $CH_2\text{—}CHCH=CH_2$ (epoxide) | $ClC_6H_4SiH(OEt)_2$ | $CH_2\text{—}CHCH_2CH_2Si(OEt)_2(C_6H_4Cl)$ |
| $CH_2\text{—}CHCH=CH_2$ | $CF_3CH_2CH_2SiH(OC_6H_4Cl)_2$ | $CH_2\text{—}CHCH_2CH_2Si(OC_6H_4Cl)_2(CH_2CH_2CF_3)$ |
| $CH_2CHCCl=CH_2$ | $(C_6H_{11})_3SiH$ | $CH_2\text{—}CHCHClCH_2Si(C_6H_{11})_3$ |
| $CH_2CHCH_2O(CH_2CH_2O)_8CH_2CH=CH_2$ | $MeHSi(OC_6H_5)_2$ | $CH_2CHCH_2O(CH_2CH_2O)_8CH_2CH_2CH_2Si(Me)(OC_6H_5)_2$ |
| $CH_2CHOCHCH_2OCH=CH_2$ (with $CH_2Cl$) | $H_2Si(OEt)_2$ | $[CH_2CHOCHCH_2OCH_2CH_2]_2Si(OEt)_2$ (with $CH_2Cl$) |
| $CH_2CHCH=CH_2$ | $Ph_2SiH(OEt)$ | $CH_2\text{—}CHCH_2CH_2Si(Ph_2)OEt$ |
| $CH_2CHCH=CH_2$ | $HSi(OEt)_3$ | $CH_2CHCH_2CH_2Si(OEt)_3$ |

Example 15

When the compound $$CH_2CHCH_2CH_2Si(Ph_2)OEt \quad (\text{with epoxide O})$$

is hydrolyzed at a pH of 8 and at 25° C., the compound $$CH_2CHCH_2CH_2Si(Ph_2)OH$$

is obtained.

Example 16

When the monoallyl ether of glycerine is reacted with 2 mols of epichlorohydrin by heating a mixture of the two in the presence of a small amount of sulfuric acid at a temperature of 125° C. for 3 hours and the resulting product is warmed with alkali, the product $$\begin{array}{l}CH_2OCH_2CH=CH_2\\ CHOCH_2CH\text{—}CH_2\\ CH_2OCH_2CH\text{—}CH_2\end{array}$$

is obtained.

When this product is reacted with $MeHSi(OEt)_2$ in the presence of chloroplatinic acid, the compound $$\begin{array}{l}(OEt)_2\\ MeSiCH_2CH_2CH_2OCH_2\\ CHOCH_2CHCH_2\\ CH_2OCH_2CHCH_2\end{array}$$

is obtained.

Example 17

When 1 mol of tetra-kis-(3-cyclohexenyl)silane is reacted with 4 mols of peracetic acid in accordance with the procedure of Example 3, the compound $$\left(\underset{O}{\overset{}{\diagdown}}\hspace{-0.3em}\underset{}{\overset{S}{\bigcirc}}\hspace{-0.3em}\right)_4 Si$$

is obtained.

Example 18

When the first reaction of Example 16 is carried out with one mol of epichlorohydrin, the compound $$\begin{array}{l}CH_2OCH_2CH=CH_2\\ CHOH\\ CH_2OCH_2CH\text{—}CH_2\end{array}$$

is obtained.

When this product is reacted with trimethylmethoxy- silane by heating a mixture of the two under conditions where methanol is removed, the compound $$\begin{array}{l}CH_2OCH_2CH=CH_2\\ CHOSiMe_3\\ CH_2OCH_2CH\text{—}CH_2\end{array}$$

is obtained.

When this compound is reacted with $MeHSi(OEt)_2$ in the presence of chloroplatinic acid and the resulting addition product is hydrolyzed with dilute aqueous alkali, the siloxane having the unit formula $$\begin{array}{l}Me\\ OSiCH_2CH_2CH_2OCH_2\\ CHOH\\ CH_2OCH_2CH\text{—}CH_2\end{array}$$

is obtained.

Example 19

When the siloxanes $$CH_3CH=CHCH_2CH_2\overset{Me}{\underset{|}{Si}}O$$

and $$CH_3\overset{Me}{\underset{|}{C}}=CHCH_2CH_2\overset{Me}{\underset{|}{Si}}O$$

are each oxidized with peracetic acid in accordance with the procedure of Example 3, the siloxanes $$CH_3CH\text{—}CHCH_2CH_2\overset{Me}{\underset{|}{Si}}O \quad \text{and} \quad CH_3C\text{—}CHCH_2CH_2\overset{Me}{\underset{|}{Si}}O$$

respectively are obtained.

That which is claimed is:
1. A siloxane of the unit formula $$A_m R'''_n SiO_{\frac{4-m-n}{2}}$$

in which
A is selected from the group consisting of radicals of the formulae $$\underset{O}{\overset{}{\diagdown}}\hspace{-0.3em}\underset{}{\overset{S}{\bigcirc}}\hspace{-0.3em}CH_2CH_2\text{—}, \quad CH_2CHCH_2OCH_2CHCH_2O(CH_2)_3\text{—}$$

and $$Y_aCH_{2-a}CY_dH_{1-d}R_e$$

in which Y is an alkyl radical of from 1 to 2 inclusive carbon atoms,
a has a value of from 0 to 2 inclusive,
c and d each have values from 0 to 1 inclusive,
R is selected from the group consisting of divalent hydrocarbon radicals of no more than 12 carbon atoms, said hydrocarbon radicals being selected from the group consisting of saturated aliphatic hydrocarbon radicals and phenylene, xenylene, tolylene, and

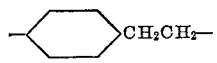

radicals and divalent radicals of the formula —R''(OR'')$_b$OR''— in which any two O atoms are separated by at least two carbon atoms, and each R'' is a divalent saturated aliphatic hydrocarbon radical of from 1 to 6 inclusive carbon atoms, and
b has a value from 0 to 8 inclusive,
R''' is selected from the group consisting of alkyl radicals of from 1 to 18 carbon atoms, vinyl, phenyl, xenyl, halophenyl and trifluoropropyl radicals,
m has the value from 1 to 3 inclusive, and
n has the value from 0 to 2 inclusive, the sum of n+m being not greater than 3.

2. A siloxane of the unit formula

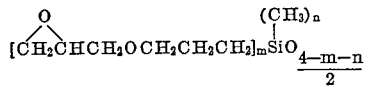

in which
m is a whole integer from 1 to 3 inclusive, and
n is a whole integer from 0 to 2 inclusive, the sum of n+m being not greater than 3.

3. A copolymeric siloxane in which from .001 to 99.999 mol percent of the siloxane units are of the formula

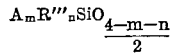

in which
A is selected from the group consisting of radicals of the formulae

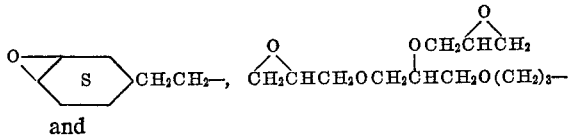

and

in which each Y is an alkyl radical of from 1 to 2 inclusive carbon atoms,
a has a value from 0 to 2 inclusive,
d and c each have values from 0 to 1 inclusive,
R is selected from the group consisting of divalent hydrocarbon radicals of not more than 12 carbon atoms, said hydrocarbon radicals being selected from the group consisting of saturated aliphatic hydrocarbon radicals and phenylene, xenylene, tolylene, and

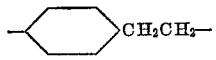

radicals and divalent radicals of the formula —R''(OR'')$_b$OR''—, in which any two O atoms are separated by at least 2 carbon atoms, and each R'' is a divalent saturated aliphatic hydrocarbon radical of from 1 to 6 inclusive carbon atoms, and
b has a value from 0 to 8 inclusive,
R''' is selected from the group consisting of alkyl radicals of from 1 to 18 inclusive carbon atoms, vinyl, phenyl, xenyl, halophenyl and trifluoropropyl radicals,
m has a value from 1 to 3 inclusive, and
n has a value from 0 to 2 inclusive the sum of n+m being not greater than 3,
the remaining siloxane units in said copolymers being selected from the group consisting of SiO$_2$ units, and siloxane units in which the substituents on the silicon atoms are selected from the group consisting of alkyl radicals of 1 to 18 carbon atoms, alkenyl radicals of 2 to 6 carbon atoms, cyclohexyl radicals phenyl radicals, halophenyl radicals, trifluoropropyl radicals, and hydrogen atoms.

4. A polymeric epoxy-organo silicon compound having a skeletal chain consisting essentially of

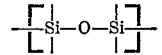

repeating units to at least one of the silicon atoms therein being attached an oxirane ring solely through a saturated carbon atom bridge, the remaining valences of the silicon atoms of said

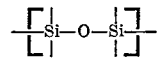

being satisfied by substituents selected from the group consisting of phenyl and methyl radicals.

5. A cured composition comprising a polymeric epoxy-organo silicon compound having a skeletal chain consisting essentially of

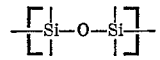

repeating units to at least one of the silicon atoms therein being attached an oxirane ring solely through a saturated carbon atom bridge, the remaining valences of the silicon atoms of said

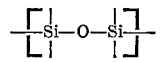

being satisfied by a member of the group consisting of methyl and phenyl, in which cross-linking has taken place through the epoxy groups thereof.

6. In the method of making a polymeric epoxy-organo silicon compound having a skeletal chain consisting essentially of

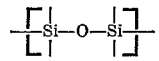

repeating units, to at least one of the silicon atoms therein being attached an oxirane ring solely through a saturated carbon atom bridge, the steps comprising condensing silane monomers containing two hydrolyzable chloro groups through which condensation occurs, the remaining valences of said monomers being satisfied by a member selected from the group consisting of methyl and phenyl substituents, at least one of said monomers containing a single alkenyl group attached to the silicon atom solely through a saturated carbon connecting bridge, thereby to provide an intermediate having a

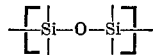

skeletal chain with said alkenyl group being attached to a silicon atom in said chain through said bridge, and epoxidizing the alkenyl group.

7. An organosilicon compound of the formula

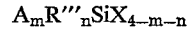

in which
A is selected from the group consisting of radicals of the formulae

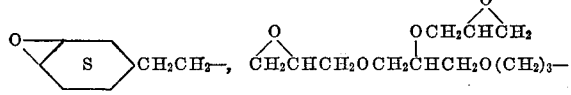

and

in which each Y is an alkyl radical of from 1 to 2 inclusive carbon atoms,
$a$ has a value from 0 to 2 inclusive,
$c$ and $d$ each have a value of 0 to 1 inclusive,
R is selected from the group consisting of divalent hydrocarbon radicals of no more than 12 carbon atoms, said hydrocarbon radicals being selected from the group consisting of saturated aliphatic hydrocarbon radicals and phenylene, xenylene, tolylene, and

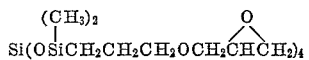

radicals and divalent radicals of the formula —R"(OR")$_b$OR"—, in which any two O atoms are separated by at least two carbon atoms and each R" is a divalent saturated aliphatic hydrocarbon radical of from 1 to 6 inclusive carbon atoms, and
$b$ has a value from 0 to 8 inclusive,
R'" is selected from the group consisting of alkyl radicals of from 1 to 18 inclusive carbon atoms, vinyl, phenyl, xenyl, halophenyl and trifluoropropyl radicals,
$m$ has a value of from 1 to 4 inclusive,
$n$ has a value of from 0 to 3 inclusive the sum of $n+m$ being not greater than 4, and
X is selected from the group consisting of hydroxyl, phenoxy, halophenoxy and lower alkoxy radicals.

8. A siloxane of the formula

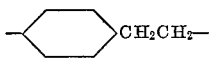

9. A siloxane of the formula

10. An organosilicon compound of the formula

in which $m$ is an integer from 1 to 3 inclusive, $n$ is an integer from 0 to 2 inclusive, and the sum of $n+m$ is not greater than 3 and X is an alkoxy radical of no more than 2 carbon atoms.

11. A silane of the formula

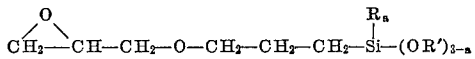

in which R is a member selected from the group consisting of methyl and phenyl, R' is a member selected from the group consisting of ethyl and phenyl, and $a$ has a value from 0 to 2.

References Cited
UNITED STATES PATENTS 2,819,245  1/1958  Shorr _____ 260—46.5 X H. D. ANDERSON, Primary Examiner U.S. Cl. X.R.

117—161; 260—18, 30.6, 30.8, 31.2, 32.4, 33.2, 33.4, 348, 448.2, 824, 826